United States Patent Office 3,563,762
Patented Feb. 16, 1971

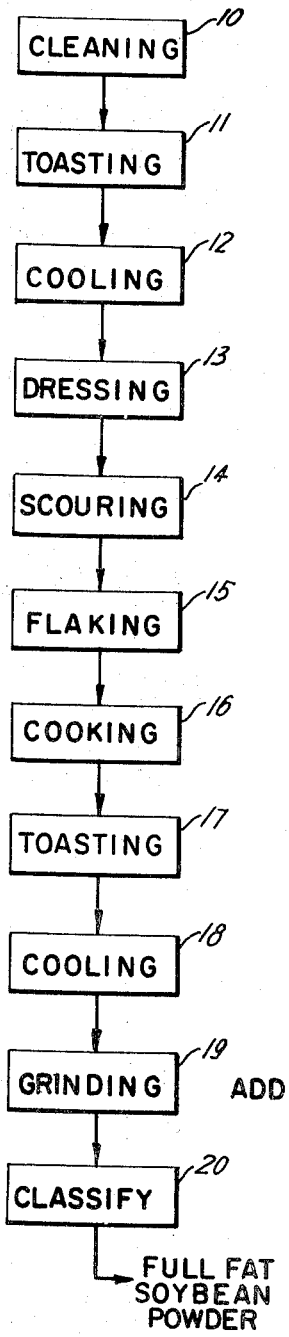
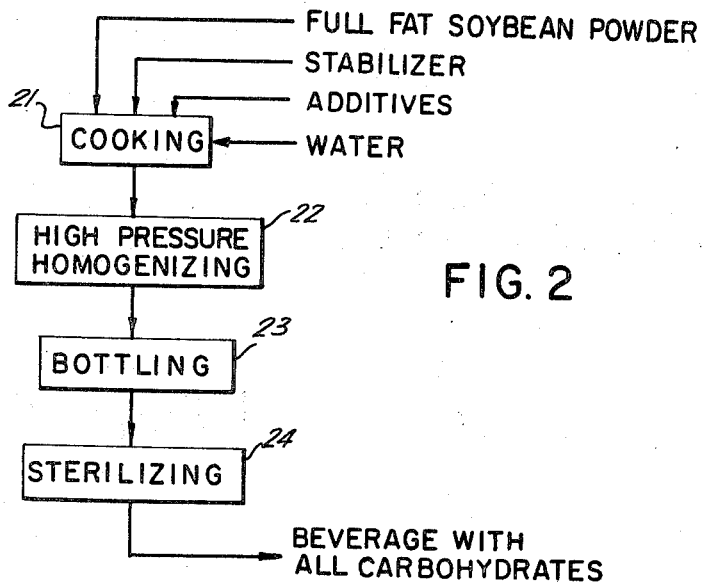
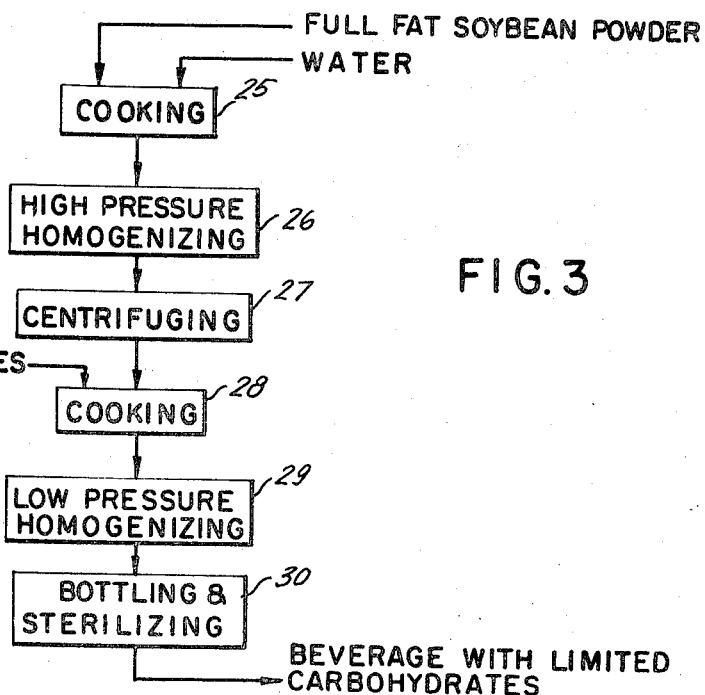
FIG. 1
FIG. 2
FIG. 3

3,563,762
PROCESS FOR PREPARING A SOYBEAN
BEVERAGE
Kwee-Seong Lo, Hong Kong, assignor, by mesne assignments, to the Hong Kong Soya Bean Products Co., Ltd., a corporation of Hong Kong
Filed Aug. 2, 1965, Ser. No. 479,686
Int. Cl. A23c 11/00
U.S. Cl. 99—64
14 Claims

ABSTRACT OF THE DISCLOSURE

Soybean powder, water, and a stabilizer are mixed and then homogenized at 8000 p.s.i. to form a beverage. The beverage may additionally be centrifuged and homogenized at a lower pressure.

This invention relates to a soybean beverage and the method of making it. More particularly, it relates to the production of a soybean beverage from a full fat soybean powder.

The soybean has been used as an important supply of food for many centuries. In the Orient, this vegetable is well appreciated for its low cost and high nutritional value. It is a particularly high source of protein and is one of the best and cheapest sources of food energy in terms of calories per unit cost of production, available today. In spite of these favorable characteristics, it has been found difficult to fully utilize the soybean as a source of human food, because it has a bitter taste and an objectionable odor and color.

Over the years, a great deal of research has been directed towards developing a satisfactory technique for making soybean products palatable while retaining all of their nutritional qualities. Some of the soybean treating methods used heretofore have included heating, soaking, washing, pressure cooking, treatment with inert gases, and treatment with oxidizing agents, reducing agents, neutralizing agents, and acidifying agents. The use of innumerable additives to reduce the undesired characteristics has also been continuously investigated. In spite of the multitude of attempts that have been made, soybean products have not been developed that are acceptable to the majority of the peoples of the world. Thus, this valuable source of cheap and nutritional food energy has not been available.

The present invention is directed primarily to the development of a soybean liquid which can be conveniently bottled and stored without the danger of spoilage, nor the need for continuous refrigeration. The product of the present invention is a refreshing beverage and can be marketed as a soft drink in the nature of Coca-Cola or 7-Up. This product is not only refreshing, but due to its prime constituent, it has the basic nutritional qualities which are found for example in animal milk.

Liquids have been developed from soybeans in the past. In one typical method of obtaining such liquids, the beans are soaked in water to soften them. They are then mashed and extracted with a large quantity of water. This type of process, wherein the nutritive ingredients of the soybeans are extracted by soaking and using the resulting fluid, is quite common.

The present invention is distinctive in that it involves the convenient production of a soybean beverage from a full fat soybean powder. This powder is suspended in water to provide a beverage having substantially the same consistency as cow milk. The resultant beverage is not subject to settling out and need not be refrigerated in order to avoid spoilage.

It is an object of the present invention to provide a soybean bottling powder from which a beverage can be prepared, bottled and sold as a soft drink.

Another object of the invention is to provide a blended soybean bottling powder to which flavoring can be added in order to produce a beverage of any desired flavor.

Still another object of the invention is to provide a soybean bottling powder that is rich in protein, fat and vitamins and yet extremely economical in cost. This product may be used as a dietary complement or supplement.

Yet another object of the invention relates to a novel process for preparing beverages of high nutritional quality from soybeans.

In accordance with the invention, a full fat soybean flour or powder is combined with stabilizing ingredients and water; the resulting solution being heated in order to assist in merging the stabilizer with the solution. Thereafter, the solution is cooked and agitated in a standard cooker. In order to adjust and control the density of the beverage mixture, centrifuging may be employed to reduce the heavy particle content and thereby prevent any settling when the subsequently bottled liquid stands over a long period of time. The centrifuging may be either an alternative of, or a supplement to, the use of the stabilizer. The density control of the beverage may be accomplished by either one or both of these techniques. Following stabilization, the beverage is homogenized under a high pressure to further break down the particles within the solution.

The novel features of the invention are set forth with particularity in the appended claims. The invention itself, however, both as to its component parts and the method of production, together with further advantages and features thereof, may best be understood by reference to the following description taken in conjunction with the accompanying drawing wherein:

FIG. 1 is a flow diagram showing the essential steps in the production of a full fat soybean powder for use in accordance with the invention;

FIG. 2 is a flow diagram showing the essential steps in the production of a first soybean beverage from the powder developed in accordance with FIG. 1; and FIG. 3 is a flow diagram showing the essential steps in the production of a second soybean beverage from the powder developed in accordance with FIG. 1.

To produce the full fat bottling powder of this invention, the process illustrated in FIG. 1 is used. The whole soybeans are first cleaned 10 to remove dirt, splits, and other foreign matter. After cleaning, the beans are heated or toasted 11 in a horizontal toaster, which may be of the nature wherein the beans are placed upon a wire screen conveyor and transported through a hot air flow for a period of time approaching five minutes. The hot air may be maintained at a temperature of approximately 300° C. and is used in order to remove excessive moisture content from the beans prior to dehulling.

After heating, the beans are immediately transferred by means of the wire screen conveyor into a cooling chamber wherein the beans are cooled 12 by currents of cold air. The abrupt drop in temperature is such that the hull shrinks away from the meat and thus, dehulling is facilitated. After cooling, the soybeans are transferred into a conventional dressing and blending machine wherein the impact action of paddles removes the hulls from the meat 13.

The next step is to separate the beans from the hulls 14 and this is done in conventional scouring apparatus wherein the soybeans are agitated to permit aspiration of the hulls from the top of the unit while the heavier meat falls to the bottom of the unit. The dehulled soybeans are next fed into a hammer mill in order to compress them into the form of flakes 15. Once flaked, the soybeans are then cooked in a "Wenger" expansion cooker. Within the cooker the flakes are first preconditioned with steam at a temperature of 212° F. to establish a moisture content of 18-21%. In this condition, they are extruded through ¼ inch die openings and come out as pellets. The cooking is performed at high pressure in order to prevent boiling.

It will be noted that the Wenger cooker is particularly advantageous for use in the production of applicant's full fat soya flour. In effect, the extrusion output renders the unit a continuous pressure cooker and the product of this type of process has the growth inhibiters of the soybean removed. In addition, it provides a flour that does not have the objectionable bitterness that is inherent in soybeans. Rather, the powder is bland in taste and entirely suitable for the addition of flavoring materials in order to produce any kind of beverage that will suit local markets. The removal of growth inhibiters from the powder renders the subsequently produced beverage more digestible. This is an important factor inasmuch as the beverage is particularly valuable for its nutritional value and as a protein supplement.

The pellets that are provided at the output of the Wenger cooker are again toasted 17 in order to reduce the moisture content to a point between 3½ and 4%. Following toasting, the beans are again cooled 18 rapidly by bringing the temperature to a level of approximately 90° F. The now dry pellets are ground 19 into a fine powder, e.g. in an "Alpin" pin mill, and classified 20 in order to obtain a final full fat soybean powder of approximately 270 to 300 mesh. The resulting powder has substantially the following composition:

| | Percent |
|---|---|
| Protein | 45 |
| Fat | 20 |
| Ash | 5 |
| Fiber | 3 |
| Other carbohydrates | 23 |
| Moisture | 4 |

Three types of soybean beverages may be prepared from the bottling powder produced as aforedescribed. The first of these beverages will contain all of the insoluble carbohydrates. The second of these beverages will contain partially insoluble carbohydrates, and the third beverage will be entirely free from insoluble carbohydrates. It should be appreciated that as hereinafter used, "carbohydrate" refers to the carbohydrate components within the soybean itself and not to any other form such as may be added in the form of sucrose, starch, etc.

A flow diagram for the production of a soybean beverage containing all of the insoluble carbohydrates is illustrated in FIG. 2.

The full fat soybean powder produced as described in connection with FIG. 1 is placed in a cooker along with water, a stabilizer, and additives for flavor and vitamin supplementing. During this cooking 21, the mixture is heated and agitated to assure adequate mixing of all components. After cooking, the mixture is subjected to high pressure homogenization 22. It has been found that a "Manton-Gaulin" high pressure homogenizer is particularly suited to this process. A pressure of approximately 8,000 pounds per square inch is maintained during homogenization in order to develop a soybean particle size ranging from 2 to 10 microns.

Particularly satisfactory results have been obtained by the use of carrageenin as the stabilizer. This is a dried plant of seaweed *Chondrus crispus* which is edible and useful for its gelatinizing properties.

The combined effect of high pressure homogenization and the addition of a stabilizer provides a permanent suspension in the soybean beverage that has never before seen obtained. After homogenization, the beverage may be bottled 23 or canned for commercial distribution. Sterilization 24 should be performed, and it may be conveniently performed after bottling.

In order to prepare soybean beverages partially containing insoluble carbohydrates, the soybean solution is first reduced within a homogenizer, as previously described, and thereafter centrifuged in order to remove the coarser particles within the range of 8 to 10 microns. These latter particles represent approximately 10 to 15% of the original dry weight powder added. A smaller amount of carrageenin is added to the solution in the event of this second method in order to yield a permanent suspension. It will be appreciated that the beverage with only partial insoluble carbohydrates is of lighter consistency than that of the first method and may be more suitable for certain uses.

In order to prepare a soybean beverage that is free from any insoluble carbohydrates, the initial steps are again utilized, as illustrated in FIG. 3. Thus, the full fat soybean flour is homogenized 26 under high pressure in order to reduce the particle size. Thereafter, the product is centrifuged 27 in order to eliminate all of the coarse particles and again cooked 28 and homogenized 29 at lower pressure to yield a stable soybean beverage which is substantially free of insoluble carbohydrates. Here, too, the beverage may be conveniently bottled and sterilized 30. It will be appreciated that the bottling or canning of this beverage may be done with any conventional equipment and is particularly simple because refrigeration is not required.

The use of high pressure homogenization prior to centrifuging provides a great advantage over the prior use of centrifuging. In the past, the soybean flour was simply mixed with water and then centrifuged. These prior methods required the removal of 70% of the total weight of soybean flour by the centrifuging in order to obtain a final beverage that would remain in suspension. The present method requires removal of only 30% of the total weight. In addition, the use of high pressure homogenization serves to reduce most of the coarse particles to a microsize which in itself assists in developing permanent suspension thereof in the liquid. It will be obvious to those in this field that this great saving in raw material is of extreme importance in the production of such beverages.

It may also be interesting to those skilled in this field that the taste and flavor of soybean beverages obtained in accordance with this third method, i.e. the method wherein the resultant beverage is free of insoluble carbohydrates, are very similar to those resulting from the traditional Chinese water extraction method.

Specific examples of processes for developing several typical soybean beverages will now be described.

In order to produce a soybean beverage containing all of the insoluble carbohydrates, the following ingredients were placed in a cooker equipped with a steam injection heater and an agitator:

TABLE I

Water—50 gal.
Bottling powder—67 lbs.
Sucrose—50 lbs.
Carrageenin—0.55 lb.
Refined soybean oil—20 lbs.
Tablet salt—0.63 lb.
Sodium bicarbonate—0.32 lb.
Vitamin A (1.0 m. I.U./gm.)—5.81 gm.
Vitamin $B_1$—1.31 gm.
Vitamin $B_2$—1.56 gm.
Niacinamide—14.0 gm.

The carrageenin, which functions as the stabilizer, is dispersed in small amount of water prior to adding it to the mixture. Following the initial mixing, water was added to a final volume of 100 imp. gallons. The mixture was then heated by direct steam injection and maintained at 180° F.–190° F. for one-half hour while constantly stirring. The heating period is important, because it assists in dissolving the carrageenin into the solution and it also softens the particles of the soybean powder.

The mixture was next high-pressure homogenized with a Manton-Gaulin homogenizer at a pressure of 8,000 pounds per square inch. It was then stored in a holding tank at a temperature of approximately 180° F. where it was constantly stirred until bottled. The functions of the Manton-Gaulin homogenizer at this stage of the process not only give a homogeneous oil and solid dispersion, but also reduce the powder particles to a size within the approximate range of 2–10 microns.

The finished beverage was then placed in regular beverage bottles by means of an automatic filler; the bottles being sealed with a metal cap. Finally, the bottled beverage was sterilized at about 250° F. for 15 minutes. After sterilization, the bottled beverage was retained in the sterilizer to cool down to approximately 100° F.–110° F. with constant shaking. Shaking of the contents at temperatures ranging from 120° F. to 140° F. is essential, because it encourages the carrageenin to start gel formation—a reaction responsible for holding up the particles in suspension.

The soybean beverage obtained from this method contained an average composition of the following:

|  | Percent |
|---|---|
| Protein | 3.0 |
| Fat | 3.1 |
| Sucrose | 5.0 |
| Other carbohydrates | 1.7 |
| Ash | 0.4 |
| Water | 86.8 |

Every 6½ fluid ounces of this beverage contains ⅓ R.D.A. (recommended daily dietary allowance by the Food and Nutrition Board, National Research Council, U.S.A.) of vitamins A, $B_1$, $B_2$ and niacinamide, as follows:

Vitamin A—2,400 I.U.
Vitamin $B_1$—0.55 mg.
Vitamin $B_2$—0.67 mg.
Niacinamide—6.00 mg.

In order to produce a soybean beverage partially containing insoluble carbohydrates, 78 pounds of bottling powder was first dispersed in approximately 50 gallons of water in a cooker. The mixture was heated to 180° F.–190° F. and held at that temperature for one-half hour with constant stirring. It was then high pressure homogenized in a Manton-Gaulin homogenizer at a pressure of 8,000 pounds per square inch. After homogenization, it was centrifuged with an in-line auto-centrifuge which was adjusted so that approximately 15% of the coarse particles of the full fat soybean powder was centrifuged out. After centrifuging, the beverage (now approximately 85% of its original volume) was pumped into another cooker and mixed with the rest of the ingredients as listed in Table I. The ratio of the ingredients remained the same as in the preceding methods, except for the carrageenin, of which only 0.25 of a pound was added. Water was added to a final volume of 100 imp. gallons and then the mixture was heated to 180° F. and thoroughly mixed. It was thereafter low pressure homogenized, this time with an ordinary dairy homogenizer at a pressure of 2,500 pounds per square inch. After homogenization, the beverage was filled in regular beverage bottles which were then sealed and sterilized.

In this latter method, the quantity of bottling powder used for producing 100 imp. gallons of soybean beverage was more than the first method, because part of the powder must be centrifuged out. The quantity of carrageenin was less. The quantity of the other ingredients remained the same as in the first method.

The soybean beverage obtained from the second method contained approximately the same composition and vitamin content as that of the first.

In order to produce a soybean beverage containing no insoluble carbohydrates, a similar procedure was followed, except: (a) the amount of full fat soybean bottling powder used was 80 pounds; (b) the centrifuge was adjusted to centrifuge approximately 30% of the coarse particles out; and (c) no carrageenin was added. The soybean beverage obtained from this method contained the following average composition:

|  | Percent |
|---|---|
| Protien | 2.4 |
| Fat | 2.7 |
| Sucrose | 5.0 |
| Other carbohydrates | 1.0 |
| Ash | 0.3 |
| Water | 88.6 |

The pH of beverage is 6.8.

For every 6½ fluid ounces it contains ⅓ R.D.A. of the following vitamins:

Vitamin A—2,400 I.U.
Vitamin B1—0.55 mg.
Vitamin B2—0.67 mg.
Niacinamide—6.00 mg.

The highly improved and palatable soybean beverages described hereinabove are each the result of particularly novel processes. By using high pressure homogenization, there is obtained an unusually effective oil and solid dispersion within the beverage. At the same time, the powder particles are reduced to sizes within the range of 2–10 microns and are therefor kept in suspension within the liquid. In addition, a stabilizer is introduced to further assist in preventing settling-out of the solids from the liquid. Finally, the advantageous results of centrifuging have been added to remove the heavier powder particles and thereby also assist in preventing settling-out and to improve the palatability of the beverage.

A number of specific illustrative embodiments of the invention have been described. It will, of course, be appreciated that the invention should not be limited to these specific embodiments since modifications may be made in both proportions and the sequence of the various process steps without departing from the teachings of the invention. It is contemplated in the appended claims to cover any modifications that fall within the true spirit and scope of the invention.

What I claim is:

1. A process for making a soybean beverage comprising preparing a soybean powder, mixing said powder with water and a stabilizer, and homogenizing the mixture at a sufficiently high pressure to reduce the size of the soybean particles to within a range of less than approximately 10 microns.

2. A process for making a soybean beverage according to claim 1 wherein said powder is a full fat soybean powder and wherein said homogenization takes place under a pressure of approximately 8,000 pounds per square inch.

3. A process for making a soybean beverage according to claim 2, including centrifuging said mixture to remove the particles having a size within a predetermined portion of said range.

4. A process for making a soybean beverage according to claim 3 including further homogenization of said mixture at a lower pressure after centrifuging.

5. A process for making a soybean beverage according to claim 2 including the addition of flavoring components prior to said high pressure homogenization.

6. A process for making a soybean beverage according to claim 2 including the addition of vitamins prior to said high pressure homogenization.

7. A process for making a soybean beverage according to claim 2 wherein said stabilizer is carrageenin.

8. A process for making a soybean beverage according to claim 1 wherein said powder is prepared by the steps comprising dehulling the soybeans, compressing them into flakes, adjusting the moisture of said flakes to a predetermined moisture content, extruding the resulting material to form pellets of soybean meat, reducing the moisture content of said pellets, and grinding them to produce said powder.

9. A process for making a soybean beverage according to claim 1, including centrifuging said mixture to remove the particles having a size within a predetermined portion of said range.

10. A process for making a soybean beverage according to claim 9 wherein said powder is a full fat soybean powder and wherein said homogenization takes place under a pressure of approximately 8,000 pounds per square inch.

11. A process for making a soybean beverage according to claim 9 wherein said powder is prepared by steps comprising dehulling the soybeans, compressing them into flakes, adjusting the moisture of said flakes to a predetermined moisture content, extruding the resulting material to form pellets of soybean meat, reducing the moisture content of said pellets, and grinding them to produce said powder.

12. A process for making a soybean beverage according to claim 9, including further homogenization of said mixture at a lower pressure after centrifuging.

13. A process for making a soybean beverage according to claim 9 including the addition of flavoring components.

14. A process for making a soybean beverage according to claim 9 including the addition of vitamins.

References Cited

UNITED STATES PATENTS

| | | | |
|---|---|---|---|
| 3,288,614 | 11/1966 | Miles | 99—64 |
| 3,097,947 | 7/1963 | Kemmerer | 99—63 |
| 1,615,822 | 12/1923 | Baile | 99—98 |
| 2,182,175 | 12/1939 | Gates | 99—98 |
| 3,290,155 | 12/1966 | Mustakas et al. | 99—98 |

A. LOUIS MONACELL, Primary Examiner

S. B. DAVIS, Assistant Examiner

U.S. Cl. X.R.

99—28, 98